UNITED STATES PATENT OFFICE.

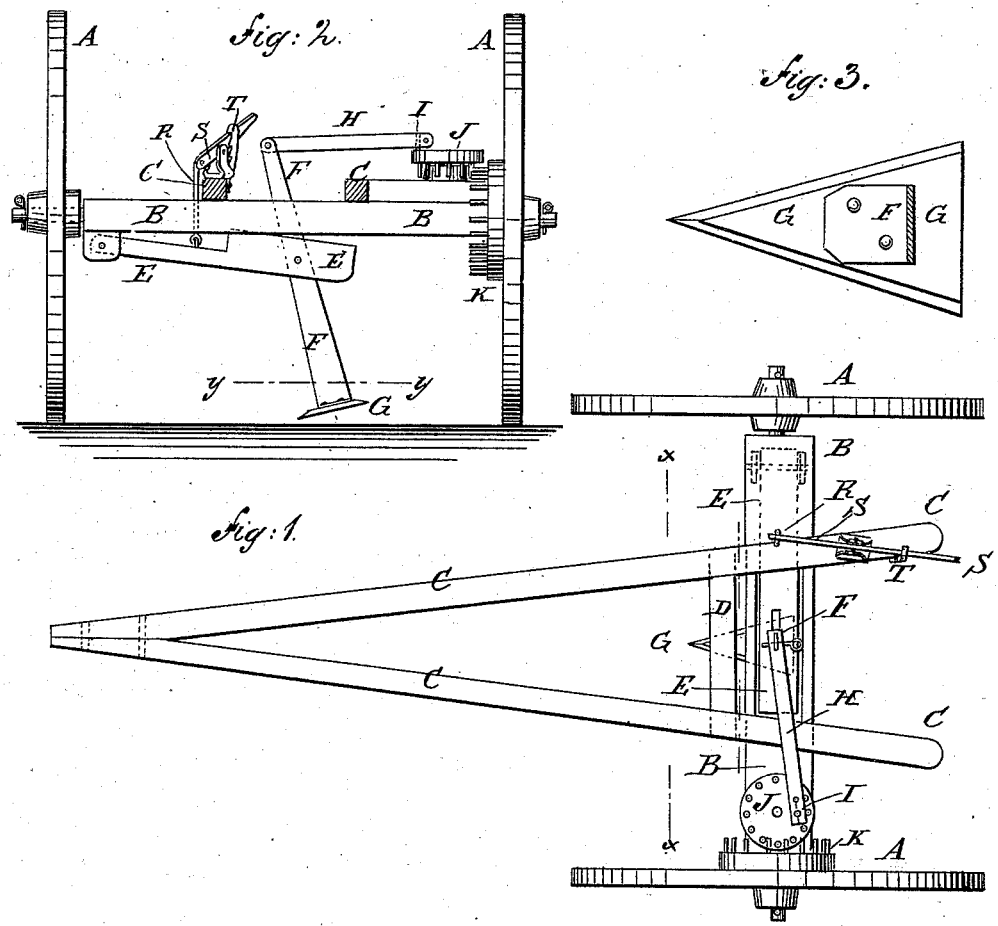

LAURA A. COLLINS, OF ELMO, AND WILLIAM G. GRAHAM, OF TERRELL, TEXAS.

COTTON-CHOPPER.

SPECIFICATION forming part of Letters Patent No. 268,626, dated December 5, 1882.

Application filed December 2, 1881. (Model.)

*To all whom it may concern:*

Be it known that we, Mrs. LAURA A. COLLINS, of Elmo, in the county of Kaufman and State of Texas, and WILLIAM G. GRAHAM, of Terrell, in the county of Kaufman and State of Texas, have invented a new and useful Improvement in Cotton-Choppers, of which the following is a full, clear, and exact description.

Reference is to be had to the accompanying drawings, forming a part of this specification, in which similar letters of reference indicate corresponding parts in all the figures.

Figure 1 is a plan view of our improvement arranged as a cotton-chopper; Fig. 2 is a sectional front elevation of the same, taken through the line $x\ x$, Fig. 1; Fig. 3 is a plan view of the chopping-hoe, the standard being shown in section through the line $y\ y$, Fig. 2.

Our invention relates to improvements in cotton-choppers; and it consists in the peculiar construction and arrangements of parts, as hereinafter more fully set forth.

A represents the wheels, B the axle, and C the tongue, of the carriage.

The tongue C is split, and is secured near the rear ends of its branches to the axle B. The parts of the tongue C are connected at the forward side of the axle B by a cross-bar, D.

The axle B is made wide and is slotted between the parts of the tongue C, as shown in Fig. 1 of drawings. To lugs, a hanger, or other support, attached to the lower side of one end of the axle B, is hinged the end of the bar E, in which, beneath the middle part of the slot in the axle B, is formed a short slot to receive the standard F. The standard F is hinged in the slot in the bar E by a pin or bolt, and to the lower end of the said standard F is attached the chopping-hoe G. The hoe G is made in the form of an isosceles triangle, and is arranged with its angle forward, so that when the said hoe is vibrated laterally its forward end will pass through the row of plants quickly, and will thus be prevented from scraping or injuring the plants left for a stand as the carriage is drawn forward. The upper end of the standard F projects above the axle B and tongue C, and to the said upper end is hinged the inner end of a connecting-bar, H, to the outer end of which is pivoted a crank-pin, I, attached to the gear-wheel J. The gear-wheel J revolves upon a pivot attached to the axle B, and meshes into a gear-wheel, K, attached to the hub of the wheel A. The gear-wheels J K may be beveled gear-wheels, or crown gear-wheels, or cog-wheels, as may be desired. With this construction, when the machine is drawn forward, the chopping-hoe will be vibrated to chop the plants to a stand.

To the hinged bar E is attached the lower end of a connecting-rod, R, which passes up through an aperature in the axle B, and is hinged at its upper end to the end of a lever, S. The lever S is pivoted to a stud or other support attached to the tongue C, so that by operating the said lever S, the bar E and the chopping-hoe standard F can be adjusted to cause the chopping-hoe G to work at any desired level. The free end of the lever S moves along a catch-bar, T, attached to the tongue C, so that the said lever, and with it the bar E and standard F will be held securely in any position into which they may be adjusted.

Having thus described our invention, we claim as new and desire to secure by Letters Patent—

The combination, with the hoe G, of a standard, F, fulcrumed to a hinged adjustable bar, E, and connected by mechanism H I J K with the ground-wheel A, as and for the purpose specified.

LAURA ANN COLLINS.
W. G. GRAHAM.

Witnesses:
H. H. HICKOK,
W. C. RENFRO.